United States Patent [19]
McGuigan et al.

[11] Patent Number: 5,734,096
[45] Date of Patent: Mar. 31, 1998

[54] SWIMMING POOL LEAK DETECTING DEVICE

[76] Inventors: James D. McGuigan, 1218 Caln Meeting House Rd., Coatesville, Pa. 19320; Katherine Underwood, 60 Barndoor Hill Rd., Simsbury, Conn. 06070

[21] Appl. No.: 839,472

[22] Filed: Apr. 14, 1997

[51] Int. Cl.⁶ .................................................. G01M 3/04
[52] U.S. Cl. ................................................ 73/49.2
[58] Field of Search ..................... 73/40, 49.2, 40.7

[56] References Cited

U.S. PATENT DOCUMENTS 5,065,690 11/1991 Bontempo ..................... 73/40.7
5,317,776 6/1994 DeMoura ...................... 15/1.7
5,551,290 9/1996 Spiegel ........................ 73/49.2

*Primary Examiner*—Michael Brock
*Assistant Examiner*—Jay L. Politzer

[57] ABSTRACT

A swimming pool leak detecting device including an interior housing slidable along a floor and side walls of a swimming pool. A telescopic pole is pivotally coupled with the interior housing. A floating housing is adapted to float on a surface of the swimming pool. The floating housing holds a predetermined amount of water therein. A hose is provided having an upper end fluidly coupled with the floating housing and a lower end fluidly coupled with the interior housing. A leak in the swimming pool will cause the water level in the floating housing to decrease. Sealant can be poured through the floating hosing and directed through the hose to the interior housing in order to seal the leak.

6 Claims, 2 Drawing Sheets

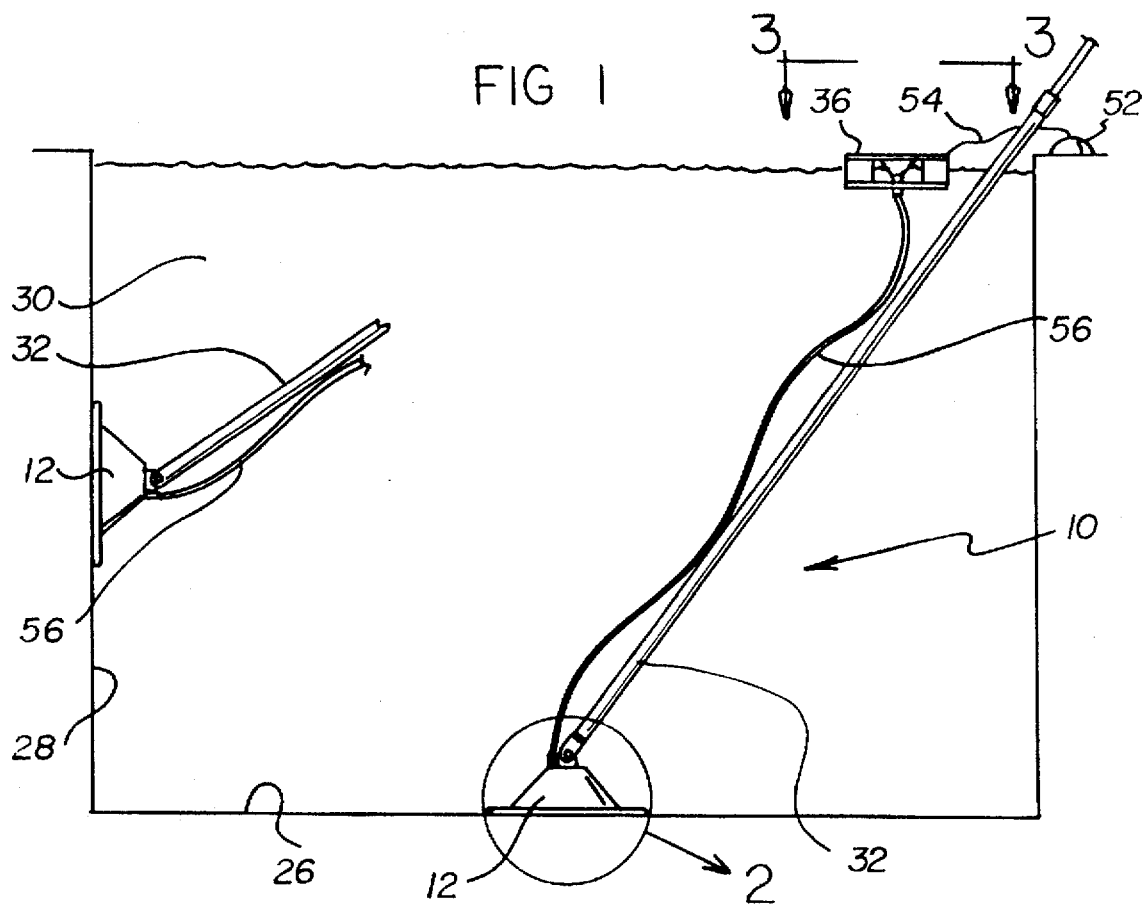
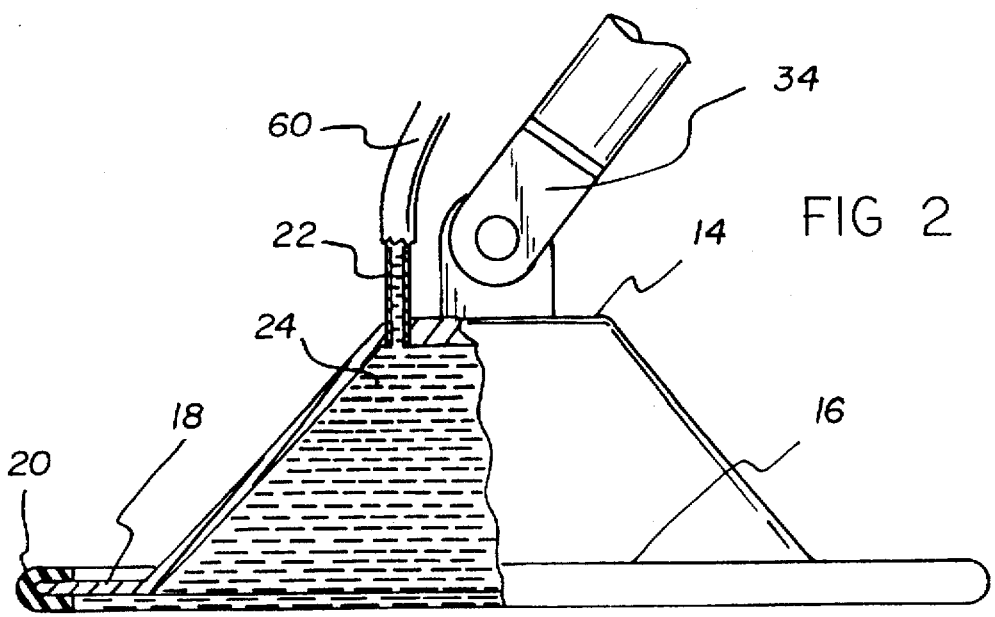

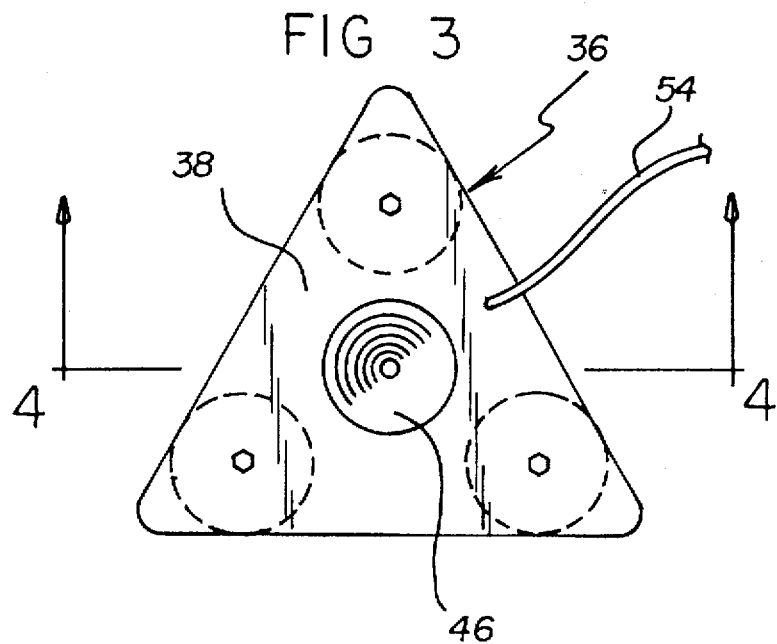
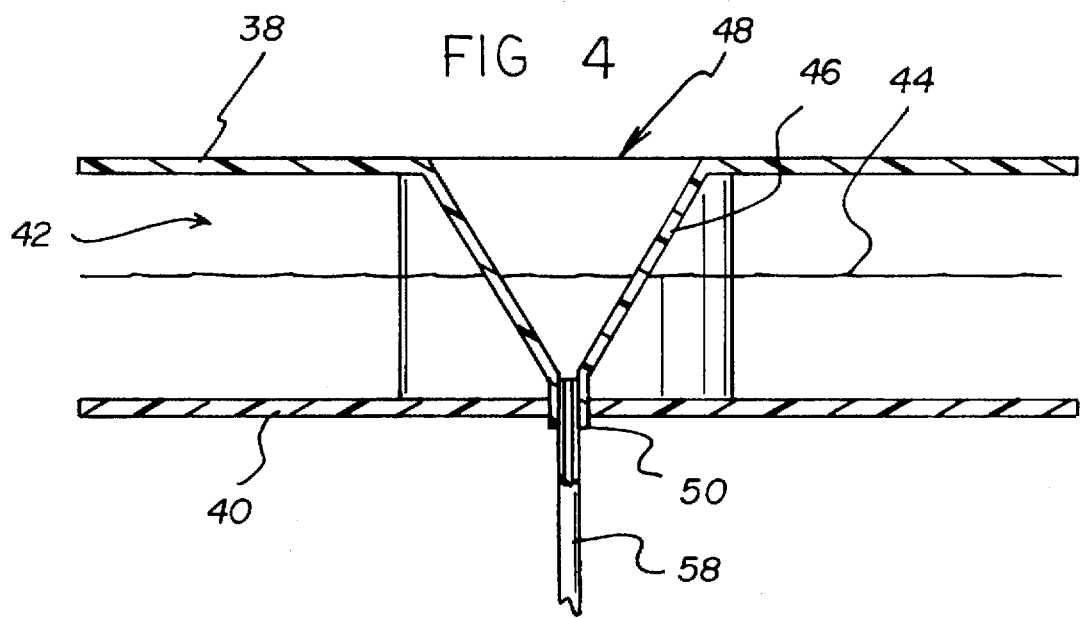

SWIMMING POOL LEAK DETECTING DEVICE

BACKGROUND OF THE INVENTION

1. Field of the Invention

The present invention relates to a swimming pool leak detecting device and more particularly pertains to detecting and fixing a leak in floors and sides of swimming pools with a swimming pool leak detecting device.

2. Description of the Prior Art

The use of leak detectors is known in the prior art. More specifically, leak detectors heretofore devised and utilized for the purpose of detecting leaks are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,261,269 to Barker discloses a leak detector for swimming pool.

U.S. Pat. No. 5,065,690 to Bontempo discloses a swimming pool leak detector.

U.S. Pat. No. Des. 261,655 to Pansini discloses the ornamental design for a head for a swimming pool cleaner.

U.S. Pat. No. 4,637,086 to Goode discloses a swimming pool vacuum cleaner.

U.S. Pat. No. 4,566,313 to Monten discloses a water vessel leak detector and method of detecting leaks.

U.S. Pat. No. 5,398,361 to Cason discloses a vacuum cleaner for submerged non-parallel surfaces.

While these devices fulfill their respective, particular objective and requirements, the aforementioned patents do not describe a swimming pool leak detecting device for detecting and fixing a leak in floors and sides of swimming pools.

In this respect, the swimming pool leak detecting device according to the present invention substantially departs from the conventional concepts and designs of the prior art, and in doing so provides an apparatus primarily developed for the purpose of detecting and fixing a leak in floors and sides of swimming pools.

Therefore, it can be appreciated that there exists a continuing need for new and improved swimming pool leak detecting device which can be used for detecting and fixing a leak in floors and sides of swimming pools. In this regard, the present invention substantially fulfills this need.

SUMMARY OF THE INVENTION

In the view of the foregoing disadvantages inherent in the known types of leak detectors now present in the prior art, the present invention provides an improved swimming pool leak detecting device. As such, the general purpose of the present invention, which will be described subsequently in greater detail, is to provide a new and improved swimming pool leak detecting device and method which has all the advantages of the prior art and none of the disadvantages.

To attain this, the present invention essentially comprises an interior housing having a frustoconical configuration. The interior housing has a closed upper end and an open lower end. The open lower end has a peripheral flange extending outwardly therefrom. The peripheral flange has a rubber seal disposed thereover. The closed upper end has a tube extending upwardly therefrom. The tube extends through the closed upper end into a hollow interior of the interior housing. The open lower end is slidable along a floor and side walls of a swimming pool. A telescopic pole is provided having a lower end pivotally coupled with the closed upper end of the interior housing. The telescopic pole has an upper end adapted for handling by a user. A floating housing is provided that is adapted to float on a surface of the swimming pool. The floating housing has an upper wall, a lower wall and a hollow interior therebetween. The hollow interior holds a predetermined amount of water therein. The floating housing includes a funnel extending through the upper wall and downwardly through the lower wall. The funnel has an enlarged open upper end and a tapered open lower end. The tapered open lower end extends outwardly through the lower wall of the floating housing. An anchor is positionable on an area adjacent to the swimming pool. The anchor has a string extending therefrom with a free end of the string secured to the floating housing. A hose is provided having an upper end coupled with the tapered open lower end of the funnel and a lower end coupled with the tube of the interior housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved swimming pool leak detecting device which has all the advantages of the prior art leak detectors and none of the disadvantages.

It is another object of the present invention to provide a new and improved swimming pool leak detecting device which may be easily and efficiently manufactured and marketed.

It is a further object of the present invention to provide a new and improved swimming pool leak detecting device which is of durable and reliable construction.

An even further object of the present invention is to provide a new and improved swimming pool leak detecting device which is susceptible of a low cost of manufacture with regard to both materials and labor, and which accordingly is then susceptible of low prices of sale to the consuming public, thereby making such a swimming pool leak detecting device economically available to the buying public.

Even still another object of the present invention is to provide a new and improved swimming pool leak detecting device for detecting and fixing a leak in floors and sides of swimming pools.

Lastly, it is an object of the present invention to provide a new and improved swimming pool leak detecting device including an interior housing slidable along a floor and side walls of a swimming pool. A telescopic pole is pivotally coupled with the interior housing. A floating housing is adapted to float on a surface of the swimming pool. The floating housing holds a predetermined amount of water therein. A hose is provided having an upper end fluidly coupled with the floating housing and a lower end fluidly coupled with the interior housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the preferred embodiment of the swimming pool leak detecting device constructed in accordance with the principles of the present invention.

FIG. 2 is a side view of the interior housing of the present invention.

FIG. 3 is a top plan view of the float of the present invention as taken along line 3—3 of FIG. 1.

FIG. 4 is a cross-sectional view of the float as taken along line 4—4 of FIG. 3.

The same reference numerals refer to the same parts through the various figures.

DESCRIPTION OF THE PREFERRED EMBODIMENT

With reference now to the drawings, and in particular, to FIGS. 1 through 4 thereof, the preferred embodiment of the new and improved swimming pool leak detecting device embodying the principles and concepts of the present invention and generally designated by the reference number 10 will be described.

Specifically, it will be noted in the various Figures that the device relates to a swimming pool leak detecting device for detecting and fixing a leak in floors and sides of swimming pools. In its broadest context, the device consists of an interior housing, a telescopic pole, a floating housing, an anchor and a hose. Such components are individually configured and correlated with respect to each other so as to attain the desired objective.

The device 10 includes an interior housing 12 having a frustoconical configuration. The interior housing has a closed upper end 14 and an open lower end 16. The open lower end has a peripheral flange 18 extending outwardly therefrom. The peripheral flange has a rubber seal 20 disposed thereover. The closed upper end has a tube 22 extending upwardly therefrom. The tube extends through the closed upper end into a hollow interior 24 of the interior housing. The open lower end is slidable along a floor 26 and side walls 28 of a swimming pool 30. The rubber seal allows the interior housing to slide smoothly along the interior surfaces of the swimming pool. As the interior housing is positioned on the floor or wall of the swimming pool, an amount of water is contained therein.

A telescopic pole 32 is provided having a lower end 34 pivotally coupled with the closed upper end of the interior housing. The telescopic pole has an upper end adapted for handling by a user. The length of the pole can be adjusted to accommodate the user as the device is utilized in varying heights and angles within the swimming pool.

A floating housing 36 is provided that is adapted to float on a surface of the swimming pool. The floating housing has an upper wall 38, a lower wall 40 and a hollow interior 42 therebetween. The hollow interior holds a predetermined amount of water 44 therein. The amount of water within the floating housing is consistent with the water level of the swimming pool. The floating housing includes a funnel 46 extending through the upper wall and downwardly through the lower wall. The funnel is also filled with an amount of water consistent with the water level of the swimming pool. The funnel has an enlarged open upper end 48 and a tapered open lower end 50. The tapered open lower end extends outwardly through the lower wall of the floating housing.

An anchor 52 is positionable on an area adjacent to the swimming pool. The anchor has a string 54 extending therefrom with a free end of the string secured to the floating housing. The anchor maintains the position of the floating housing close to the user so as to allow the water level of the floating housing to be visualized at all times.

A hose 56 is provided having an upper end 58 coupled with the tapered open lower end of the funnel and a lower end 60 coupled with the tube of the interior housing. If a leak is present in the wall or floor of the swimming pool, movement of the interior housing will become more difficult and water will drain into the leak thereby causing water to drain from the interior housing which will cause water to drain out of the funnel. As the water level in the funnel lowers, the user is alerted to the leak in the swimming pool. To remedy the leak, sealant can be poured through the funnel to mend the leak.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A swimming pool leak detecting device for detecting and fixing a leak in floors and sides of swimming pools comprising, in combination:

an interior housing having a frustoconical configuration, the interior housing having a closed upper end and an open lower end, the open lower end having a peripheral flange extending outwardly therefrom, the peripheral flange having a rubber seal disposed thereover, the closed upper end having a tube extending upwardly therefrom, the tube extending through the closed upper end into a hollow interior of the interior housing, the open lower end slidable along a floor and side walls of a swimming pool;

a telescopic pole having a lower end pivotally coupled with the closed upper end of the interior housing, the telescopic pole having an upper end adapted for handling by a user;

a floating housing adapted to float on a surface of the swimming pool, the floating housing having an upper wall, a lower wall and a hollow interior therebetween, the hollow interior holding a predetermined amount of water therein, the floating housing including a funnel extending through the upper wall downwardly through the lower wall, the funnel having an enlarged open upper end and a tapered open lower end, the tapered open lower end extending outwardly through the lower wall of the floating housing;

an anchor positionable on an area adjacent to the swimming pool, the anchor having a string extending therefrom with a free end of the string secured to the floating housing; and a hose having an upper end coupled with the tapered open lower end of the funnel and lower end coupled with the tube of the interior housing.

2. A swimming pool leak detecting device fixing a leak in floors and sides of swimming pools comprising, in combination:

an interior housing slidable along a floor and side walls of a swimming pool;

said housing having an upper wall and a lower wall;

a telescopic pole pivotally coupled with the interior housing;

a floating housing adapted to float on a surface of the swimming pool, the floating housing holding a predetermined amount of water therein; and a hose having an upper end fluidly coupled with the floating housing and a lower end fluidly coupled with the interior housing.

3. The device as set forth in claim 2 and further including an anchor positionable on an area adjacent to the swimming pool, the anchor having a string extending therefrom with a free end of the string secured to the floating housing.

4. The device as set forth in claim 2 wherein the interior housing having an open lower end having a peripheral flange extending outwardly therefrom, the peripheral flange having a rubber seal disposed thereover.

5. The device as set forth in claim 2 wherein the interior housing having a tube extending upwardly from an upper end thereof for coupling with the lower end of the hose.

6. The device as set forth in claim 2 wherein the floating housing includes a funnel extending through its upper wall downwardly through its lower wall, the funnel having an enlarged open upper end and a tapered open lower end, the tapered open lower end extending outwardly through the lower wall of the floating housing for coupling with the upper end of the hose.

* * * * *